G. SMITH.

CARTRIDGE.

No. 598.

Reissued Sept. 14, 1858.

UNITED STATES PATENT OFFICE.

GILBERT SMITH, OF BUTTERMILK FALLS, NEW YORK.

IMPROVEMENT IN CARTRIDGES.

*Specification forming part of Letters Patent No.* 17,702, *dated June* 30, 1857; *reissue No.* 598, *dated September* 14, 1858.

*To all whom it may concern:*

Be it known that I, GILBERT SMITH, of Buttermilk Falls, in the county of Orange and State of New York, have invented a new and useful Improvement in Cartridges for Breech-Loading Fire-Arms; and I do hereby declare that the following is a full, clear, and exact description of the same, reference being had to the accompanying drawings, forming part of this specification, in which—

Figure 1:
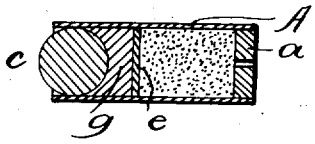
Figure 2:
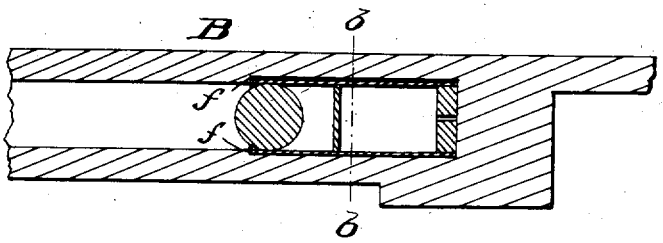
Figure 3:
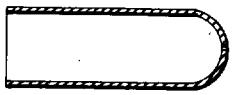
Figure 4:
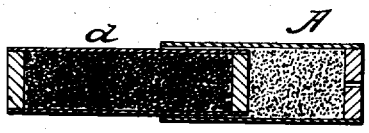

Figure 1 is a longitudinal central section of a ball-cartridge constructed according to my invention. Fig. 2 is a longitudinal section of the breech and portion of the barrel of a gun, with the cartridge in its place in readiness to be fired. Fig. 3 is a section showing a modification of the case of the cartridge. Fig. 4 is a longitudinal sectional view, showing the application of the invention to shot-cartridges.

Similar letters of reference indicate corresponding parts in the several figures.

My invention relates to the class of cartridge-cases which are used for the purpose of preventing the escape of gas from the joints of breech-loading fire-arms; and consists in making the cartridge-case, or the cylindrical portion of it, of some impermeable and elastic substance, such as india-rubber cloth, vulcanized india-rubber, or gutta-percha, so that it may expand laterally by the force of the explosion of the charge against a joint between the barrel and the breech, may close the same hermetically, and (unlike metal) may contract itself, after the explosion, by its own contractile property, so as to be easily disengaged from the chamber of the breech-loading gun.

To enable others to make and use my invention, I will proceed to describe its construction and operation.

The cartridge-case represented in Fig. 1 is made by rolling up a piece of india-rubber cloth, of a moderately elastic character, into the form of a cylinder, A, so as to wind several thicknesses thereof upon a wooden or metal cylinder of a diameter equal to that of the general bore of the piece for which the cartridge is intended, and to the largest part of the ball, previously spreading on such parts of the cloth as are to be brought in contact by rolling up glue or some suitable cement or adhesive material to cause their adhesion; and into one end of the hollow cylinder thus formed I fit and cement tightly a stout breech-piece, *a*. This breech-piece may be rolled up in the cloth in forming the cylinder, and may be of the same or like material.

The cylinder A is made long enough to contain the charge of powder, and to receive either the whole of the ball *c*, or that portion of it whose diameter is greatest, and consequently its internal diameter should be the same as the general bore of the barrel, so that the ball may fit tightly within it without the necessity of tying to the ball or of closing the front end over the ball. The chamber to receive this cartridge is to be cylindrical, and so much larger than the general bore of the barrel as is required by the thickness of cylindrical portion A of the case, so that the case may fit very easily within the chamber.

In Fig. 2 the cartridge is shown in outline in the chamber of a gun-barrel, B. The cartridge is intended to be retained in the barrel during and after the discharge by a shoulder, *f*, where the enlarged chamber meets the smaller portion of the bore of the barrel, for the purpose of packing the joint in which the chamber opens when the explosion takes place, such joint being near the middle of the chamber, as shown at *b b* in Fig. 2 or at any other part thereof, and the packing of the joint being effected by the lateral expansion of the case under the influence of the tension of the gases, liberated by the explosion of the powder. This case, unlike a soft metal, contracts again by its own elasticity after the explosion, and therefore, when the breech is opened, the operator can take it in his fingers and withdraw it from the chamber.

When a cartridge is to be constructed on the same principle for shot the case A, of india-rubber cloth, vulcanized india-rubber, or gutta-percha, is made in the same way; but the shot may be contained in a separate and thinner case, *d*, of paper, which is fitted into the mouth of the case A, and protrudes therefrom to enter the smaller part of the bore, with which its exterior corresponds in size.

The case shown in Fig. 3, instead of being formed by rolling up a piece of cloth to form a cylinder, and fitting in a breech-piece, as in the cartridges shown in Figs. 1 and 4, is molded or cast all in one piece from vulcanized india-rubber.

Fig. 1 exhibits the best mode of applying the lubricating material. On the top or in front of the charge of powder I placed a wad or disk of leather, *e*, fitting closely within the case, and outside of this wad or disk I place a quantity of tallow or other lubricating material, as indicated at *g*, and upon this I place the ball *c*, thereby inclosing the lubricating material within the case.

When the explosion takes place, the lubricating material is blown out of the case in a melting state after the ball, and spreads all over the inner surface of the barrel, leaving the same lubricated for the next ball, each cartridge thus carrying the lubricating material for the ball of the next one. The lubricating material may be placed within the case in front of the ball, and then will be driven through the barrel ahead of the ball.

I do not claim, generally, the packing of the joint between the barrel and the breech by the explosion of a cartridge-case of soft metal, nor the construction of a cartridge-case so as to be retained in the chamber after the discharge; but

What I claim as my invention, and desire to secure by Letters Patent, is—

Making the cartridge-case, or at least the cylindrical portion thereof, of some impermeable and elastic substance, such as india-rubber or gutta-percha, substantially as above described, so that it may be expanded laterally by the force of the explosion of the charge, and will contract itself after the explosion by its own inherent property.

Witnesses: GILBERT SMITH.

CHAS. P. SMITH,

JOHN N. THOMPSON.